(12) United States Patent
Hancock et al.

(10) Patent No.: US 9,039,372 B2
(45) Date of Patent: May 26, 2015

(54) WIND TURBINE BLADE (75) Inventors: Mark Hancock, Southampton (GB);
Wuh Ken Loh, Singapore (SG); Yun Chong Gabriel Chang, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 900 days.

(21) Appl. No.: 12/967,455

(22) Filed: Dec. 14, 2010

(65) Prior Publication Data

US 2011/0116927 A1 May 19, 2011

Related U.S. Application Data

(63) Continuation-in-part of application No. 12/598,272, filed as application No. PCT/EP2008/055366 on Apr. 30, 2008, now Pat. No. 8,517,682, which is a continuation of application No. PCT/EP2007/054223, filed on Apr. 30, 2007.

(60) Provisional application No. 61/379,216, filed on Sep. 1, 2010.

(51) Int. Cl.
*F03D 11/00* (2006.01)
*F03D 1/06* (2006.01)
*F03D 7/02* (2006.01)

(52) U.S. Cl.
CPC ............ *F03D 1/0683* (2013.01); *F03D 1/0675* (2013.01); *F03D 7/0232* (2013.01); *F05B 2240/31* (2013.01); *Y02B 10/30* (2013.01); *Y02E 10/721* (2013.01); *Y02E 10/723* (2013.01)

(58) Field of Classification Search
CPC ................ F03D 11/00; F05B 2240/31; F05B 2240/311; B64C 3/50; B64C 11/18

USPC .......... 416/23, 24, 146 R, 240, 226; 244/212, 244/213, 215
See application file for complete search history.

(56) References Cited

U.S. PATENT DOCUMENTS

| 2,333,482 | A |   | 11/1943 | Littman |
|---|---|---|---|---|
| 2,616,509 | A |   | 11/1952 | Thomas |
| 2,625,997 | A | * | 1/1953 | Doak .............................. 416/23 |
| 3,987,984 | A |   | 10/1976 | Fischer |
| 4,298,313 | A |   | 11/1981 | Hohenemser et al. |
| 4,348,155 | A | * | 9/1982 | Barnes et al. ................... 416/46 |

(Continued)

FOREIGN PATENT DOCUMENTS

| DE | 3219930 | 1/1983 |
|---|---|---|
| DE | 4002972 | 8/1991 |

(Continued)

OTHER PUBLICATIONS

Marc Gultzow; Notice of Opposition issued in corresponding European Patent No. 08749944.8; Jan. 23, 2012; 19 pages; European Patent Office.

*Primary Examiner* — Ninh H Nguyen
(74) *Attorney, Agent, or Firm* — Wood, Herron & Evans, LLP (57) ABSTRACT

The invention relates to a wind turbine blade with at least one control surface and an actuator inside the main body of the wind turbine blade for moving the control surface, wherein the actuator comprises a fluidic muscle, a controller and a pump, and wherein the fluidic muscle is adapted to change in length and width when the pressure of the fluid within the fluidic muscle is varied.

25 Claims, 10 Drawing Sheets

(56) References Cited

U.S. PATENT DOCUMENTS

| | | | |
|---|---|---|---|
| 5,320,491 A * | 6/1994 | Coleman et al. | 416/24 |
| 5,570,859 A | 11/1996 | Quandt | |
| 6,109,870 A * | 8/2000 | Yamakawa et al. | 416/23 |
| 6,213,433 B1 | 4/2001 | Gruensfelder et al. | |
| 6,295,006 B1 * | 9/2001 | Kohlhepp | 340/946 |
| 6,419,187 B1 | 7/2002 | Buter et al. | |
| 6,807,894 B2 * | 10/2004 | Reininger | 92/5 R |
| 6,863,239 B2 * | 3/2005 | Terpay | 244/17.11 |
| 6,868,773 B2 * | 3/2005 | Davis et al. | 92/92 |
| 7,445,431 B2 * | 11/2008 | Larsen et al. | 416/1 |
| 7,632,068 B2 * | 12/2009 | Bak et al. | 416/23 |
| 2003/0123973 A1 | 7/2003 | Murakami | |
| 2004/0105752 A1 | 6/2004 | Wobben | |
| 2006/0145483 A1 | 7/2006 | Larsen et al. | |
| 2008/0223680 A1 * | 9/2008 | Hardtle et al. | 192/31 |
| 2008/0292461 A1 | 11/2008 | Stiesdal | |
| 2009/0028705 A1 | 1/2009 | Meldgaard et al. | |
| 2011/0067563 A1 * | 3/2011 | Woods et al. | 92/90 |

FOREIGN PATENT DOCUMENTS

| | | |
|---|---|---|
| DE | 100 21 850 | 11/2001 |
| DE | 10233102 | 1/2004 |
| EP | 0283730 | 2/1988 |
| EP | 1524431 | 7/2004 |
| EP | 1666723 | 6/2006 |
| FR | 2290585 | 11/1974 |
| GB | 2308836 | 9/1997 |
| JP | 2006248456 | 9/2006 |
| WO | WO 00/75508 | 12/2000 |
| WO | 02/051730 | 7/2002 |
| WO | WO 2004/088130 | 10/2004 |
| WO | WO 2004/099608 | 11/2004 |
| WO | WO 2007/045940 | 4/2007 |

* cited by examiner

WIND TURBINE BLADE

1. CROSS REFERENCE TO RELATED APPLICATIONS

This application is a continuation-in-part of U.S. patent application Ser. No. 61/379,216 which was filed with the U.S. Patent and Trademark Office on Sep. 1, 2010 and U.S. patent application Ser. No. 12/598,272 which was filed with the U.S. Patent and Trademark Office on Oct. 30, 2009. Application Ser. No. 12/598,272 is a national stage application of PCT application Serial No. PCT/EP20081055366 filed on Apr. 30, 2008 and which claims priority from PCT application Serial No. PCT/EP2007/054223 filed on Apr. 30, 2007, the entire contents of which are incorporated by reference.

2. FIELD OF THE INVENTION

The present invention relates to a wind turbine blade comprising one or more modifiable air foil sections which are attached to the blade body, the air foil sections being adapted to modify the air foil shape of a trailing edge of the blade. A pneumatic or fluidic muscle actuator is provided for controlling the lift profile of the wind turbine blade. Moreover, the present invention relates to a wind turbine comprising at least one of the wind turbine blade.

3. DESCRIPTION OF THE RELATED ART

Figure 1:
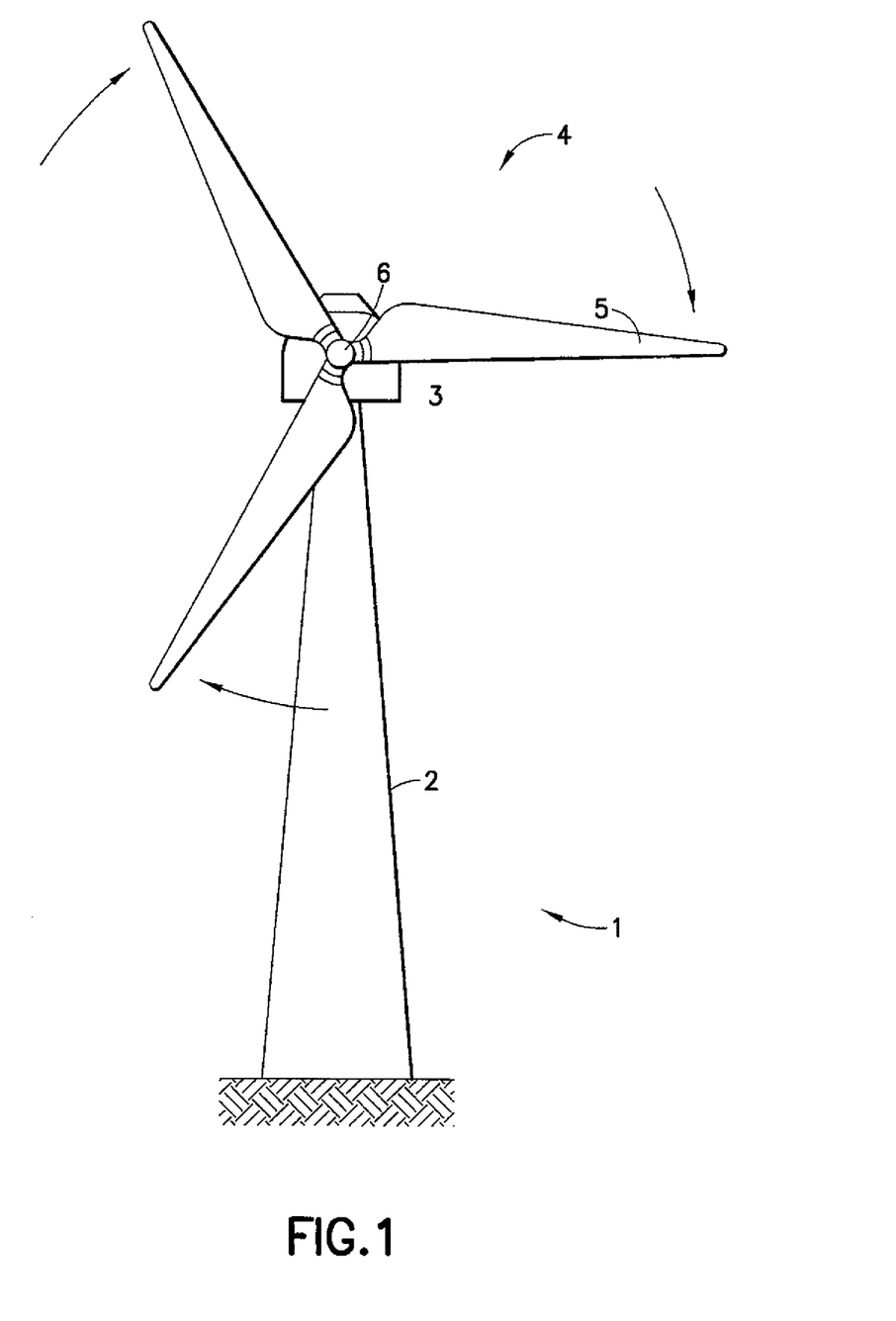
FIG. 1 illustrates a known wind turbine.

FIG. 1 illustrates a wind energy power plant such as a wind turbine 1. The wind turbine 1 comprises a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 150 meters or more.

Most modern wind turbines are controlled and regulated continuously during operation with the purpose of ensuring optimal performance in all operating conditions, such as at different wind speeds or subject to different demands from the power grid. The wind turbine can also be regulated to account for fast local variations in the wind velocity, such as so-called wind gusts. Also, as the loads on each of the blades vary due to the passing of the tower or the actual wind velocity varying with the distance to the ground (the wind profile), the ability to regulate each of the wind turbine blades individually is advantageous as it enables the wind loads to be balanced and reduces the yaw and tilt loads acting on the rotor.

Wind turbine blades can be provided with at least two different types of movement control, pitch control and lift profile control. Pitch control involves rotating an entire wind turbine blade 5 around its longitudinal axis at the junction with the hub. Lift control is effected by changing the aerodynamic surface of part of or the entire length of the blade, thereby increasing or decreasing the blade lift or drag correspondingly. Different means of changing the aerofoil shape are known such as different types of movable or adjustable flaps, vortex generators for controlling the boundary layer separation, adaptive elastic members incorporated in the blade surface, means for changing the surface roughness, adjustable openings or apertures, or movable tabs. One advantage of lift control devices over pitch control is that they can be relatively small compared to the size of the blade and can give a faster response, in comparison with rotating the entire blade, due to there being less inertia involved.

One example of a wind turbine blade having a changing aerodynamic surface is disclosed in WO 2004/088130 which discloses a wind turbine blade comprising one or more shape modifiable air foils sections wherein the outer surface of each of the shape modifiable air foils are substantially continuous in all of its shape and actuating means for providing the shape changes in the shape modifiable air foil sections.

However known systems may exhibit poor mechanical stability. Moreover, known systems are generally made from expensive materials.

SUMMARY OF THE INVENTION

In a first aspect the present invention relates to a wind turbine blade having a suction side and a pressure side, which sides are connected at a leading edge and a trailing edge, the blade including a blade body and one or more shape modifiable air foil sections in the area of the trailing edge of the blade, each of the one or more modifiable air foil sections having a pressure skin and a suction skin, a first one of the pressure and suction skins being secured to or integral with the blade body, and a second one of the pressure and suction skins being slidably movable with respect to the blade body, so that a force applied to one of said skins causes said second skin to slide with respect to the blade body, so as to thereby modify the air foil shape of the trailing edge.

Thanks to the provision of shape modifiable airfoil sections, preferred embodiments of the inventions reduce variations in loads on the blade. Such load variations may e.g. derive from turbulence, wind shear, tower shadow, gusts and yaw errors. Embodiments of the invention provide an overall reduction of turbine mass, including the mass of the blades, tower, hub and foundation, or they allow for an increased rotor size, i.e. increased energy production, at the same load level relative to a smaller rotor without shape modifiable trailing edge sections.

In comparison to prior art shape modifiable air foil sections, embodiments of the blade according to the present invention are beneficial with respect to mechanical stability and costs. The non-movable parts of the blade, including the blade body and/or the first skin, may be made from any material used in wind turbine blade production, and a variety of materials are available for the second skin. Examples of materials for the second skin, which may be sufficiently flexible and yet sufficiently stiff to resist aerodynamic loads include glass reinforced plastic (GRP), Kevlar, carbon, rubber, wood, fiber carbon, epoxy, and aluminum. For example, in a 1 m chord blade the moveable trailing edge might be 0.3 m chordwise and 3 mm thick of GRP. The differential pressure across the trailing edge might be 3 kN/m2 exerting a chordwise force of approximately 0.9 kN m length and a BM of 0.135 kNm per m length. This can be balanced by a force of 1.5 kN per m length with a typical 90 mm lever arm at the sliding joint. This may be balanced in an embodiment with vacuum actuation by a vacuum pressure differential over 90 mm of 33 kN/m2 or ⅓ rd bar. The movement of the sliding joint to obtain a strong camber and a major lift increase is of the order of 10 mm.

In the present context, the term 'slide' should be understood to encompass any relative linear or rotational movement between the second skin and the blade body.

In the present context, the term 'wind turbine' should be understood to include any machine capable of drawing energy out of moving air and converting such energy to mechanical and/or electrical energy.

The ability of the second skin to slide with respect to the blade body confers the benefit that profile continuity from leading edge to trailing edge can be ensured in preferred embodiments of the invention.

Preferably, the chord-wise length and the thickness of the deformable trailing edge section do not change when the section deforms.

In one embodiment, the suction skin is secured to or integral with the blade body, while the pressure skin is movable (slidable) with respect to the blade body. In other embodiments, the pressure skin is secured to or integral with the blade body, while the suction skin is movable with respect to the blade body.

According to an aspect of the invention there is provided a wind turbine blade comprising a blade body, at least one blade control surface, and an actuator for moving the blade control surface relative to the blade body, wherein the actuator comprises a fluidic muscle adapted to contract when the pressure of the fluid within the fluidic muscle is varied, such that the at least one blade control surface is drawn from a first operating position into a second operating position. This provides a more robust actuator for a control surface, in which the number of moving parts is minimized.

The blade or the wind turbine preferably comprises a controller capable of controlling the shape of the at least one shape modifiable air foil section or control surface, e.g. via an actuator or fluidic muscle, so as to adapt the shape of the shape modifiable air foil section(s) to external conditions. Such conditions may e.g. include wind velocity, wind direction, rpm of the wing, generator load, blade deflection, blade rate of deflection, blade acceleration, inflow angle, sectional pressure distribution, and/or blade root bending moment. The actuator control preferably ensures profile continuity from leading edge to trailing edge at any position along the blade surface.

In one embodiment, the control surface is made of a pretensioned resilient material, such that the control surface is biased to move from the second operating position to the first operating position when the fluidic muscle is relaxed. This aids rapid movement of the blade from the second operating position to the first operating position.

The trailing edge portions may be releasably attached to the blade body, e.g by means of a bolt and nut, thus allowing the air foil sections to be replaced or serviced. In one embodiment, the first i.e. non-movable skin, is formed integrally with the blade body, the first skin thereby forming an extension of the blade body. The blade or the airfoil sections may comprise a light material such as Glass Reinforced Plastic or Kevlar, carbon, rubber, or wood. The blade body may e.g. be made from the aforementioned materials and/or from fiber carbon, epoxy, aluminum, and/or from pultruded elements, e.g. as described in European patent No. 1 417 409 B1.

The second skin may be slidably movable transversely to a longitudinal direction of the blade. In one embodiment at least a part of the second skin is adapted to overlap at least a part of the blade body during said sliding movement. In order to reduce turbulence in the area of overlap, the blade body may in said area of overlap define a recess for receiving the overlapping part of the air foil such that during relative movement between the air foil and the blade body the overlapping part of the second skin may be moved into or out of the recess.

The blade may comprise at least one shape-modifiable chamber defined by at least one wall, which forms part of or is connected to one of said skins, so that the second skin moves when the force is applied to the chamber wall. For example, in order to generate the relative movement between the air foil and the blade body, each of the shape modifiable air foil sections may comprise a pressure chamber which when pressurized or depressurized provides said force. In the context of the present invention the term "pressurized" and "depressurized" shall be understood as increases or decreases, respectively, of the pressure in the pressure chamber. In one embodiment, the second skin forms a wall of the pressure chamber. Hence, pressurization or depressurization of the pressure chamber causes the wall (i.e. the second skin) to move relative to the blade body.

The interior of the blade or part thereof may conveniently be utilized as a vacuum reservoir and/or a reservoir of compressed air. The reservoir may for example extend longitudinally within the blade. Alternatively or additionally, a pump system may be provided in the interior of the blade, or appropriate connectors may be provided for connecting the chamber or pressure chamber to an external pressure/vacuum source arranged e.g. in a nacelle of a wind turbine. In one embodiment, the blade comprises a spar, which may be used as a support for the vacuum/pressure reservoir or source. For example, the spar itself or a part thereof may itself constitute the vacuum or pressure reservoir.

Alternative actuator systems or actuators for modifying the shape of the trailing edge air foil sections may include an electric actuator, a hydraulic actuator, a link motion system, and/or so-called "smart materials", including piezo-electric materials, magnetostrictive and electrostrictive materials, i.e. materials with a capability to change viscosity, e.g. from liquid to almost solid state, shape alloy materials (SMA), thermoresponsive materials and/or conducting polymers.

In one embodiment, the actuator contains at least one pair of fluidic muscles, and one fluidic muscle of the pair acts to move the blade control surface from a first position to a second position, and the second fluidic muscle of the pair acts to move the blade control surface from a second position to a first position. This provides an alternative or a supplementary method of moving blade control surfaces from a second position to a first position, and also provides a more active control mechanism.

In one embodiment, the fluidic muscle is housed in a compartment within the blade body. In this position, the fluidic muscle is provided proximate the blade control surface but is nevertheless in a position where it can be accessed for maintenance purposes.

In one embodiment, a first end of the fluidic muscle is attached to the blade body. This provides a stable attachment point for the fluidic muscle.

In one embodiment, the first end of the fluidic muscle is coupled to a structural spar in the main body.

In one embodiment, a second end of the fluidic muscle is coupled to the at least one blade control surfaces. The fluidic muscle can be attached directly to the blade control surface/s.

In one embodiment, the at least one blade control surface comprises a first side, forming a part of the external surface of the blade, and an extension portion of the first side for extending into the blade body and coupling to the second end of the fluidic muscle. The extension portion attaches the blade control surface to the fluidic muscle.

In one embodiment, the wind turbine blade comprises a shoulder for applying tension to the extension portion of the at least one blade control surface. The shoulder guides the movement of the blade control surface, any components attaching the fluidic muscle to the blade control surface, and/or the fluidic muscle. It also provides tension to the linkage between the blade control surface and the fluidic muscle, ensuring the linkage is responsive and aiding movement from the second position to the first position.

In one embodiment, the shoulder comprises a roller. The roller provides a lower friction means for applying tension to the blade control surface.

In one embodiment, the shoulder is a curved guide surface. The curved guide surface provides a means for applying tension whilst minimizing the stress on the extension portion, maximizing the fatigue life.

In one embodiment, the blade body comprises a rear spar located adjacent the at least one blade control surface in the chordwise direction, and the fluidic muscle couples to the at least one blade control surface through the slot. In operation, the slot in the rear spar guides the movement of the fluidic muscle and of any components attaching the fluidic muscle to the blade control surface.

In one embodiment, the at least one blade control surface comprises a first side, forming a part of the external surface of the blade, and wherein the first side is truncated to leave a gap between the first side and the blade body to accommodate movement of the at least one blade control surface from the first to the second position. This allows more freedom of movement for the at least one blade control surface and may therefore allow a greater range of control.

In one embodiment, the wind turbine blade comprises a cover, extending from the blade body towards the first side to substantially cover the gap. The cover is provided to minimize ingress of water, debris, and any other foreign bodies into the inner workings of the wind turbine blade and/or the at least one wind turbine blade control surface.

In one embodiment, the wind turbine blade comprises an actuator member extending between the fluidic muscle and the first side of the at least one blade control surface. This member connects the fluidic muscle and the at least one blade control surface. It may be appropriate to provide an actuator plate passing through the slot in the rear spar, as the fluidic muscle and/or blade control surface may be inappropriate guiding means.

In one embodiment, the fluidic muscle is arranged in a substantially chordwise direction to the blade body. In embodiments in which the blade control surface is in a substantially chordwise direction, it is advantageous to provide the fluidic muscle arranged in substantially the same direction for efficiency and to minimize lateral stress.

In one embodiment, the wind turbine blade comprises a supply pipe for providing fluid to the fluidic muscle. This allows a source of fluid to be housed elsewhere.

In one embodiment, the supply pipe is pressurized. This allows fluid to be pressurized elsewhere and may allow faster blade control surface actuation.

In one embodiment, the wind turbine comprises a valve for controlling the flow of fluid to the fluidic muscle. This allows greater control of the fluidic muscle actuator, and may allow faster actuation.

In one embodiment, the valve is a solenoid valve. Solenoid valves are fast and reliable allowing quick actuation whilst also being low maintenance.

In one embodiment, the actuator comprises a local fluid storage tank. This allows fluid to be stored locally and released when needed. In the case where multiple fluidic muscle actuators are provided, it also allows for the same supply pipe to be used for more than one independently acting fluidic muscle actuator.

In one embodiment, the actuator comprises a pump coupled directly to the fluidic muscle. Fluid flow in and out of the muscle can then be directly controlled.

In one embodiment, the actuator is operable to provide at least a first flap operating position, a second flap operating position and a third flap operating position. In some embodiments, it may be preferable or necessary to provide three, or more, flap operating positions. This allows for more control flexibility.

In one embodiment, the at least one control surface is a trailing edge flap on the trailing edge of the blade. This allows variation of the wind profile of the wind turbine blade.

The air foil shape may define a relaxed state, i.e. the first position, and an actuated non-relaxed state, i.e. the second position. In one embodiment, pressurization of the pressure chamber causes the air foil shape to move from the relaxed state to the actuated state. In another embodiment depressurization of the pressure chamber causes the air foil shape to move from the relaxed state to the actuated state. An applied pressure may affect the air foil section in a downward direction, and suction may affect the air foil section in an upward direction.

In one embodiment an air foil shape is provided in the relaxed state when the pressure in the pressure chamber is substantially equal to the ambient air pressure, i.e. the air pressure at the geographical location of the blade/wind turbine. In another embodiment the air foil shape is provided in the actuated state when the pressure in the pressure chamber is substantially equal to the ambient air pressure.

In one embodiment a decrease in the air pressure in the pressure chamber causes the pressure chamber to contract while increases in the air pressure causes the pressure chamber to expand. Expansion or contraction of the pressure chamber causes said second one of the upper and lower skin to move relative to the blade body. In one embodiment expansion of the pressure chamber causes said second one of the upper and lower skin to move away from the blade body and vice versa.

In order to generate the increase and decrease in the pressure chamber the blade may comprise one or more actuators, each of which may be adapted to change the pressure in the pressure chamber of at least one of the air foil sections. The actuators may be provided closer to a hub portion than to a tip portion of the blade.

At least 10%, i.e. 10-100% of the length of the trailing edge, when measured from a tip portion to a hub portion of the blade, may be shape modifiable by means of an air foil section, such as about 10-50%, such as 10-40%, such as about 15-35%, such as about 20-30%. The deformable section or sections are optimally placed along the span of the blade in such a way to maximize the load reduction. The exact placement may be determined e.g. by trial and error testing and/or by numeric simulation. In one embodiment the shape modifiable portion of the trailing edge is located closer to a tip portion of the blade than to a hub portion thereof. As an example the shape modifiable portion may be provided in the tip portion of the blade, i.e. the distance from the air foil section to the tip may constitute less than 10% or the total length of the blade, such as less than 5%, such as less than 2% of the length of the blade. The deformable section or sections, also referred to as trailing edge flaps, have been found to be most efficient near the tip of the blade. In preferred embodiments of the invention, the trailing edge flaps are placed near the tip of the blade in such a way that load alleviation is maximized. The trailing edge flaps need not be contiguous (i.e. in one piece). They may be made of several piece with or without mutual interstices.

At transitions between shape-modifiable trailing edge sections and non-shape modifiable trailing edge sections, the blade may probably comprise a transition section made from shape-modifiable material, e.g. an elastomeric material, in order to ensure a continuous and/or unbroken transition between the modifiable and non-modifiable trailing edge sections.

At least 5% of the blade in the direction from the trailing edge towards the leading edge, when measured in a chord direction of the blade, may be shape modifiable, such as at least 10%, at least 20%, at least 30%, such as at least 40%, such as at least 50%. In one embodiment 5-30% of the blade in the direction from the trailing edge towards the leading edge, when measured in a chord direction of the blade, is shape modifiable.

Embodiments of the present invention also include shape modifiable air foil sections at the inboard section of the blade, i.e. within 50% of the blade lengths from the root of the blade. Shape modifiable inboard sections of the blades may limit thrust, improve aerodynamic efficiency, and they may be used for rotor speed control.

The skins may be sufficiently flexible to bend so as to allow the aerofoil shape of the blade to change when the air foil is moved from the relaxed to the actuated state. At the same time the said skins may be sufficiently stiff to resist aerodynamic loads, such that the air foil(s) may be trimmed in order to obtain more energy from the wind acting on the blade. The flexibility of the skins may be graduated (may vary) in the chordwise direction of the blade so as to obtain the desired airfoil shape whilst retaining sufficient stiffness to resist local aerodynamic pressure differences.

The actuator for providing the actuating force to modify the air foil sections may be provided within the blade or outside the blade. In the latter embodiment, a force distributing system is preferably provided in order to distribute the force to the individual blades of the wind turbine. In case of a pressurization or depressurization actuator, such a vacuum source, or in case of a hydraulic actuator, one or more accumulators may be provided, so that a boost is available, when a change of shape is needed.

The shape modifiable air foil section or sections may be provided continuously over the entire length of the blade or continuously over a portion thereof. Alternatively, spaced shape modifiable sections (or "flaps") may be provided with interstices of non-modifiable sections being provided between them. Preferably, transitions from shape-modifiable and non-modifiable sections should be continuous and closed. The separate sections may be individually controllable or controllable in common, i.e. all having the same and/or proportional shape and/or deflection angle. Separate actuators may be provided for each of the sections, or a common actuator and a force distributing system may be provided.

In a second aspect the present invention relates to a wind turbine comprising at least one blade according to any of the preceding claims, such as two blades such as three blades, such as four blades, such as five blades.

The wind turbine may comprise an actuator for providing the force mentioned under the first aspect of the invention. The force may be generated for a one or more of the blades of the wind turbine. In one embodiment the actuator is adapted to generate a vacuum source or a pressurized source. In one embodiment the wind turbine comprises a plurality of the blades according to the first aspect of the invention and one vacuum source which is connected to the pressure chamber of at least two of the blades.

It should be understood that the provision of pressure as a source for an actuating force for modifying the shape of an airfoil section of a wind turbine blade constitutes an independent aspect of the present invention. Hence, in a third aspect, the invention provides a wind turbine blade having a suction side and a pressure side, which sides are connected at a leading edge and a trailing edge, wherein one or more shape modifiable air foil sections are defined in the area of the trailing edge of the blade, and wherein each of the shape modifiable air foil sections comprises a pressure chamber which when pressurized or depressurized causes a modification of the shape of the airfoil section.

Embodiments of the blade of the third aspect of the invention may include features of the blade of the first aspect of the invention. Hence, each of the shape modifiable air foil sections may have a pressure skin and a suction skin, with a first one of the pressure and suction skins being secured to or integral with the blade body, and a second one of the pressure and suction skins being slidably movable with respect to the blade body, so that a force applied to one of the skins causes the second skin to slide with respect to the blade body, so as to thereby modify the air foil shape of the trailing edge. Such embodiments are described in detail above with reference to the first aspect of the invention, and it will be appreciated that any structural and functional feature described herein may be provided in embodiments of the blade of the third aspect of the invention.

The invention also provides a wind turbine comprising a blade according to the third aspect of the invention, and an actuator comprising a vacuum and/or pressure source for providing pressurization and/or depressurization of the pressure chamber.

Further, the invention provides a wind turbine blade having a suction side and a pressure side, which sides are connected at a leading edge and a trailing edge, the blade including a blade body and one or more shape modifiable air foil sections in the area of the trailing edge of the blade, each of the one or more shape modifiable air foil sections having a pressure skin and a suction skin, a first one of the pressure and suction skins being secured to or integral with the blade body, and a second one of the pressure and suction skins being slidably movable with respect to the blade body, so that a force applied to said first skin causes said second skin to move with respect to the blade body, so as to thereby modify the airfoil shape of the trailing edge.

BRIEF DESCRIPTION OF THE DRAWINGS

The invention will now be described in further detail with reference to the drawings in which.

DETAILED DESCRIPTION OF THE PRESENTLY PREFERRED EMBODIMENTS

Figure 2:
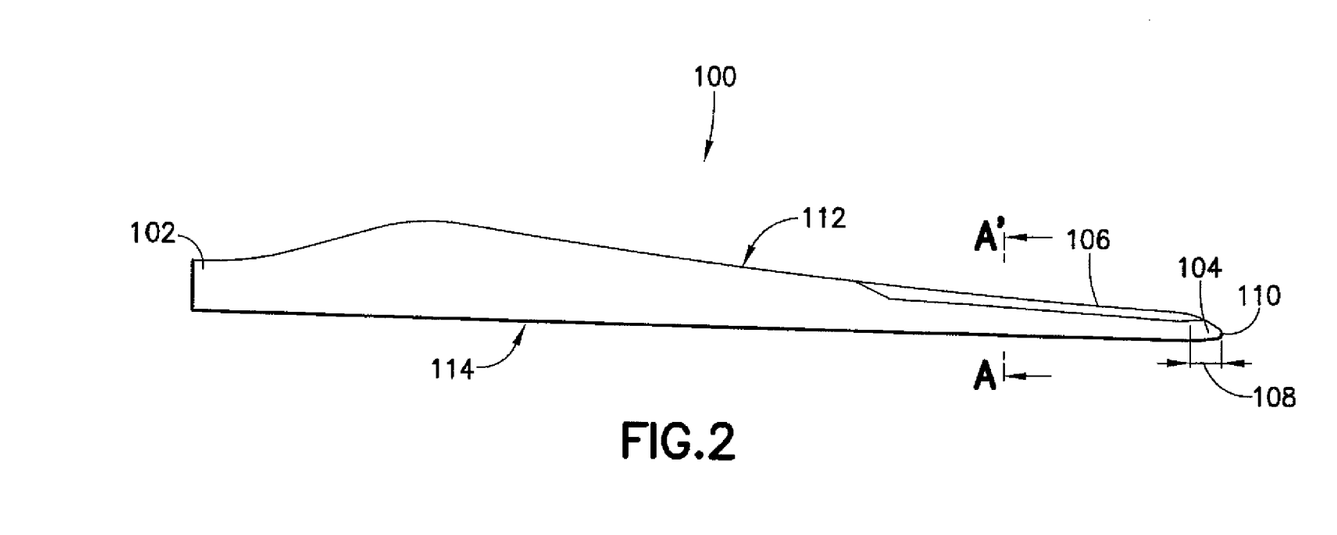
FIG. 2 discloses a front view of a wind turbine blade when seen from the pressure side (windard side), FIG. 3 discloses a cross section A-A' of the wind turbine blade of FIG. 2, FIG. 4 discloses movement of the airfoil between the relaxed position and the actuated position, FIG. 5 discloses a close up of the pressure chamber of the air foil.

FIG. 2 discloses a front elevational view of a wind turbine blade 100, which defines a root portion 102 and a tip portion 104. The wind turbine blade 100 comprises an air foil 106, which is provided closer to the tip portion 104 of the blade 100 than to the root hub portion 102. The distance 108 between the tip 110 and the airfoil is preferably below 10% of the total length of the blade 100. The root hub portion comprises means (not shown) for securing the blade 100 to the hub of a wind turbine. The blade defines a trailing edge 112 and a leading edge 114. The air foil 106 is shape modifiable so as to allow the blade 100 to modify the air foil shape of its trailing edge 112. At least 10%, such as at least 25% of the trailing edge 112, when measured from the tip portion 104 to the root hub portion 102 is shape modifiable due to the air foil 106.

Figure 3:
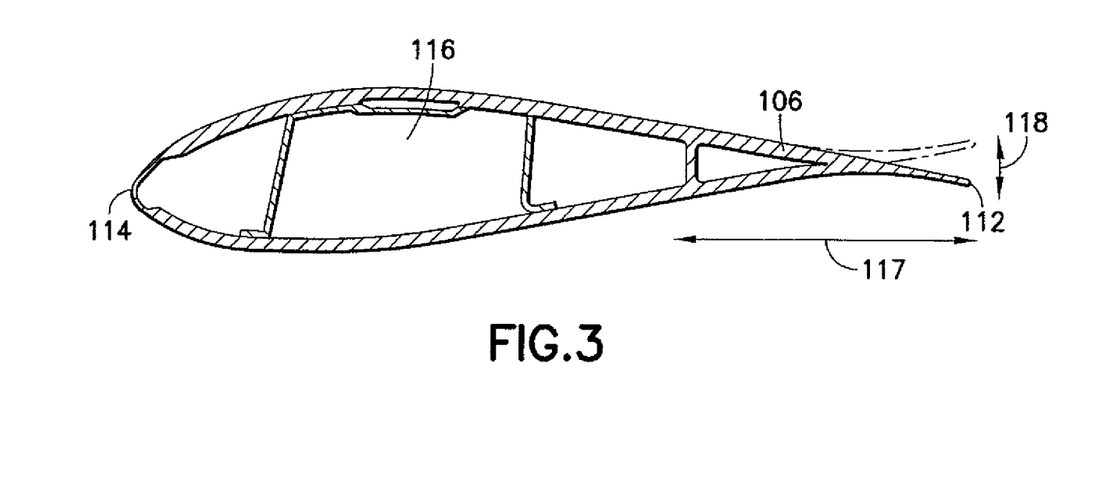

FIG. 3 discloses a cross-section A-A' of the blade 100 of FIG. 2. The blade 100 defines a leading edge 114 and a trailing edge 112. The blade 100 comprises an air foil 106 which is secured to a blade body 116 of the blade 100, e.g. by means of a bolt and a nut (not shown). The air foil is movable between a relaxed state and an actuated state as indicated by arrow 118, and the air foil constitutes at least 5% of the blade in the direction from the trailing edge to the leading edge as indicated by arrow 117.

Figure 4:
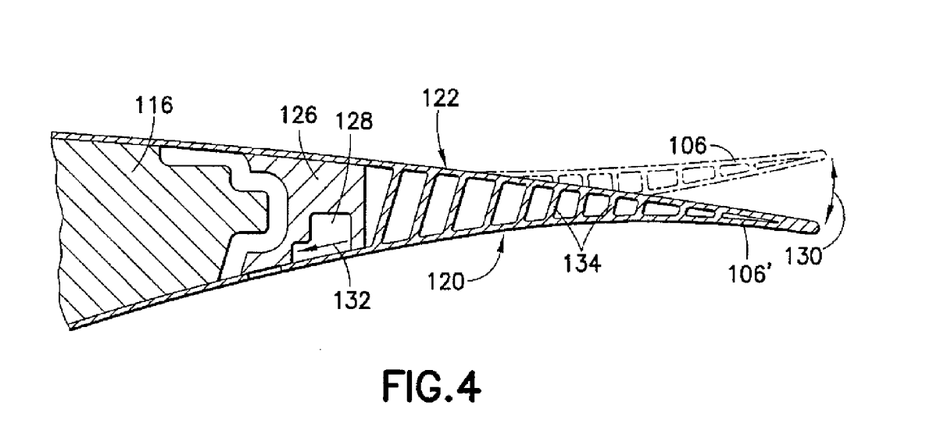

FIG. 4 discloses the air foil 106', 106 in the relaxed state 106 and in the actuated state 106'. The air foil defines a lower skin 120 and an upper skin 122. The upper skin is secured to a base part 126 of the air foil 106, while the lower skin 120 is adapted to slide relative to the base part 126. Accordingly, an actuator, such as depressurizing of a pressure chamber 128 causes the air foil to move from the relaxed state 106 to the actuated state 106' as indicated by arrow 130. At the same time the lower skin 120 slides relative to the base as indicated by arrow 132. In the embodiment of FIG. 4 the air foil 106 comprises a plurality of reinforcing bars 134, and it will be appreciated that said bars 134 must be sufficiently flexible to allow the air foil to move from the relaxed state 106 to the actuated state 106'. In an alternative embodiment the air foil does not comprise the reinforcing bars 134.

In order to ensure sealing of the vacuum and/or pressure chamber or chambers 128, the ends of the shape modifiable air foil sections should be closed. Also, a pressure tight closure should be provided at the transition from the shape modifiable air foil sections.

Figure 5:
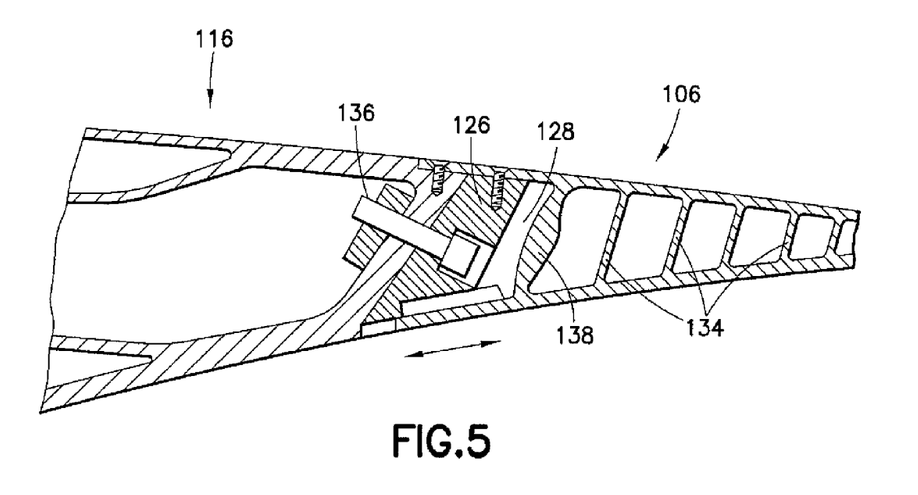

FIG. 5 discloses a close up of the area of attachment of the air foil 106 to the blade body 116. The base part 126 of the air foil is secured to the blade body 116 by means of a nut and a bolt 136. A pressure chamber 128 is defined between the base part 126 and a wall 138. Depressurization of the pressure chamber 128 causes the air foil to move downwards in the drawing. Alternatively, or as a supplement, pressurization of the pressure chamber causes the air foil to move upwards in the drawing.

Figure 6:
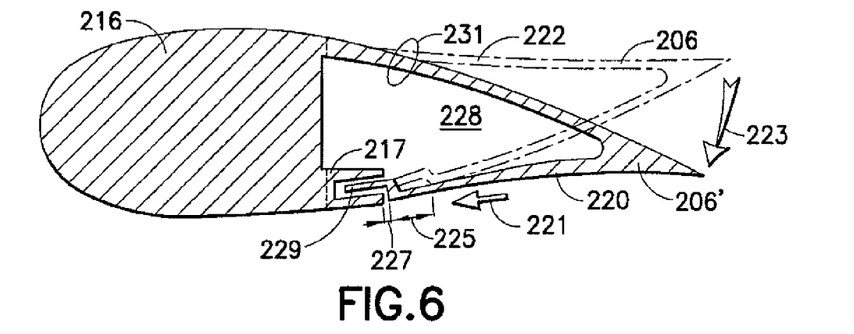
FIGS. 6-8 disclose further embodiments of a blade according to the present invention.
Figures 7, 8:
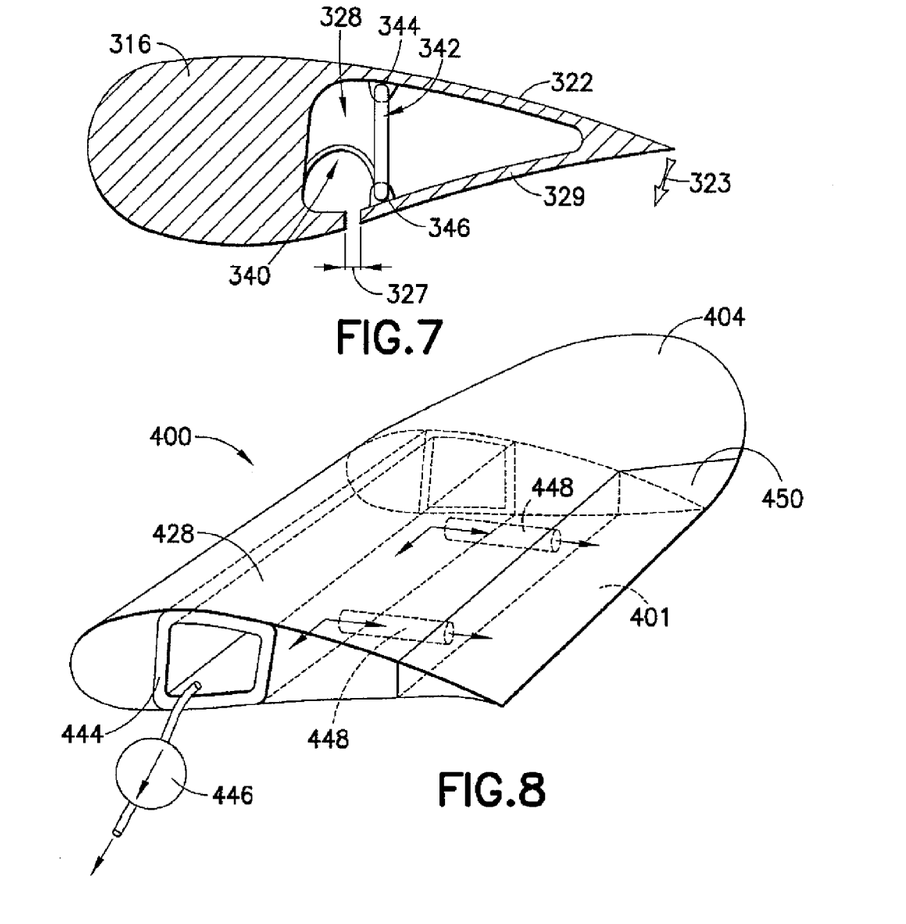

FIGS. 6-8 show cross sections of further embodiments of a blade according to the present invention. The embodiment of FIG. 6 comprises a blade body 216, and lower and upper skins 220 and 222. The cross section of the lower skin 220 has an L-shaped extension 229 at the transition between the lower skin 220 and the blade body 216, the L-shaped extension being receivable in a corresponding U-shaped profile 217 of the blade body 216. The trailing edge section is movable as a result of an applied operating force 221, originating e.g. from a force source provided in a cavity 228, e.g. a pressure chamber, in the blade. Alternatively, the operating force may result from aerodynamic forces acting on the trailing edge. The applied operating force results in a displacement of the trailing edge from the relaxed state 206 to the as indicated by arrow 223 actuated state 206'. At the same time, the lower skin moves along arrow 225, thereby reducing or extending the gap 227, while the extension 229 slides in the profile 217. At position 231 of the upper skin 222, the bending stiffness of the upper skin is preferably tailored to make the desired shape of the trailing edge upon application of the operating force.

In the blade of FIG. 7, the lower and upper skins 320, 322 are interconnected by a hinged plate 342 extending through the blade. The plate is hinged to the upper skin at hinge 344 and to the lower skin at hinge 346. An actuator such as a pressure chamber 328 is defined by a wall of the blade body 316, a deformable membrane 340 and the hinged plate 342. As a result of a change of pressure in the pressure chamber 328, the membrane 340 will act on the hinged plate 342, which in turn will act on the upper and/or lower skin in order to move the trailing edge along the path indicated by arrow 323. At the same time, the size of the gap 327 changes.

FIG. 8 shows a perspective illustration of a blade 400 comprising a shape-modifiable trailing edge section 401. The blade comprises a spar 444 forming a cavity 428, which is utilized as a pressure/vacuum reservoir. Pressure or vacuum is provided by a pressure or vacuum pump 446 arranged in the blade, e.g. in a different section of the spar, or in a nacelle of a wind turbine. The reservoir 428 is in fluid communication with the shape-modifiable trailing edge via tubes 448. The shape of the trailing edge section of the blade is modifiable by the structure of any of FIGS. 4-7. A section of elastomeric material 450 is provided at a transition between the trailing edge section or flap 401 and a tip portion 404 of the blade.

Figure 9A:
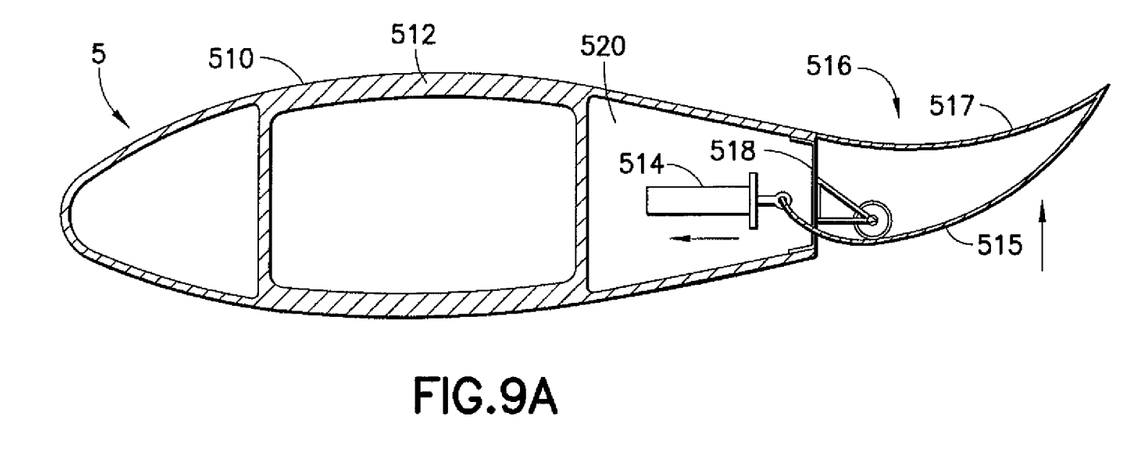
FIGS. 9A and 9B are schematic diagrams in cross-section through a wind turbine blade, illustrating the principle of operation according to an embodiment of the invention.
Figure 9B:
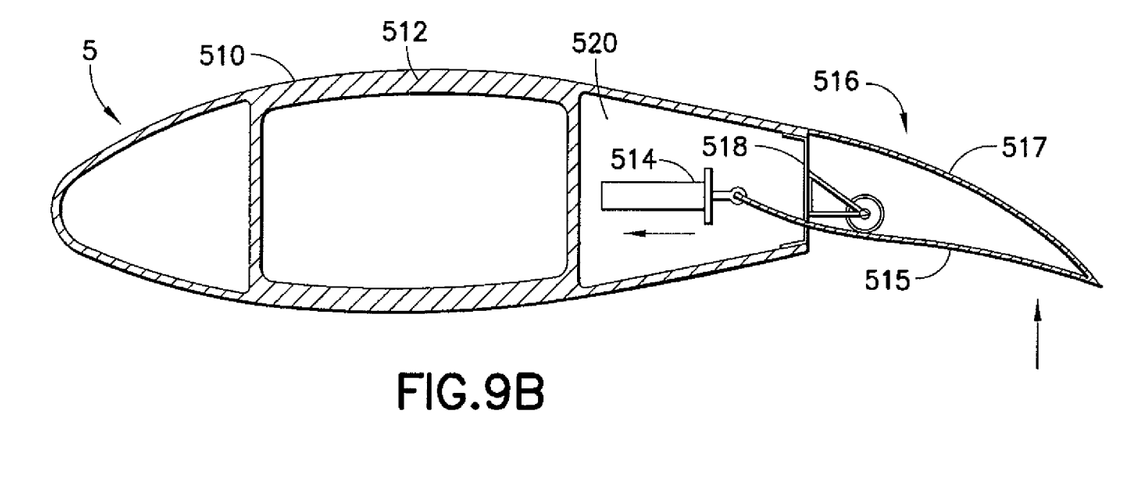

As an alternative to the pressure chamber actuator described above, an actuator in the form of a pneumatic or fluidic muscle 514 can be used to change the shape of the turbine blade. As shown in FIGS. 9A and 9B, the blade 5 comprises an outer shell 510, a main spar 512, a pneumatic or fluidic muscle 514, a flap 516, having a first pressure side 515 and a second suction side 517, and a rear spar or terminating portion 518. The fluidic muscle 514 is provided within a compartment 520 in the blade body 5 between the main spar 512 and the flap 516. The compartment 520 is defined by the outer shell 510, the main spar 512 and rear spar 518. Rear spar 518 both closes the cavity at the rear of the blade and provides a connection surface on which the flap 516 can be mounted. Details of the preferred flap mounting methods are described later.

The main spar 512 and the rear spar 518 are structural members that extend along the span of the blade 5. They may be formed in a box shape, an I-beam shape or a C-beam shape.

In the spanwise direction, but not shown in the diagrams, further walls can be provided in the blade to compartmentalize the space between the main spar 512 and the rear spar 518. As is known in the art, these can also be used as attachment points for any components housed in the blade as well as for improving the strength of the blade in use.

The fluidic muscle 514 is a reinforced resilient bladder having a shape which changes in a predetermined way under variations in its internal pressure. Fluid muscles are available commercially, and may be operated using pressurized air, other gases, or hydraulic fluid.

In this example, the fluidic muscle is arranged to contract in the chordwise direction as the pressure of the fluid in the muscle increases. By adjusting the pressure within the fluidic muscle, the fluidic muscle can therefore be arranged to apply a pulling force to the control surface moving the control surface between at least a first (shown in FIG. 9A) and a second operating position (shown in FIG. 9B). A source of pressurized fluid is therefore provided for supplying fluid under pressure to the fluidic muscle and for receiving fluid drained from the muscle.

The flap itself can be returned from the second operating position to the first operating position using a further fluidic muscle for pulling the flap in the opposite direction. However, in order to simply the construction, it is preferred if the flap itself is constructed from a pretensioned resilient material that is biased to occupy the first position. The action of the fluidic muscle subsequently acts against the bias to pull the flap into the second operating position, such that when the fluidic muscle is released, the flap moves back to the first position. This can be seen in more detail in FIG. 9B, in which the suction side of the flap 516 is shown stretched and under tension. Thus, when the flow of fluid to the fluidic muscle is reduced or suspended, the stored energy in the suction side of the flap 517 returns the flap to the position in FIG. 9A.

In an example of the invention, the deflection of the flap in the first and second positions can be by as much as 10 degrees either side of a chord line drawn through the blade from the leading edge to the trailing edge.

Typically, the flap is manufactured in the first operating position shown in FIG. 9A, at an angle of at least −10 degrees relative to the chord line. Pre-tensioning the flap in this way improves the stiffness of the mechanism.

Figure 10:
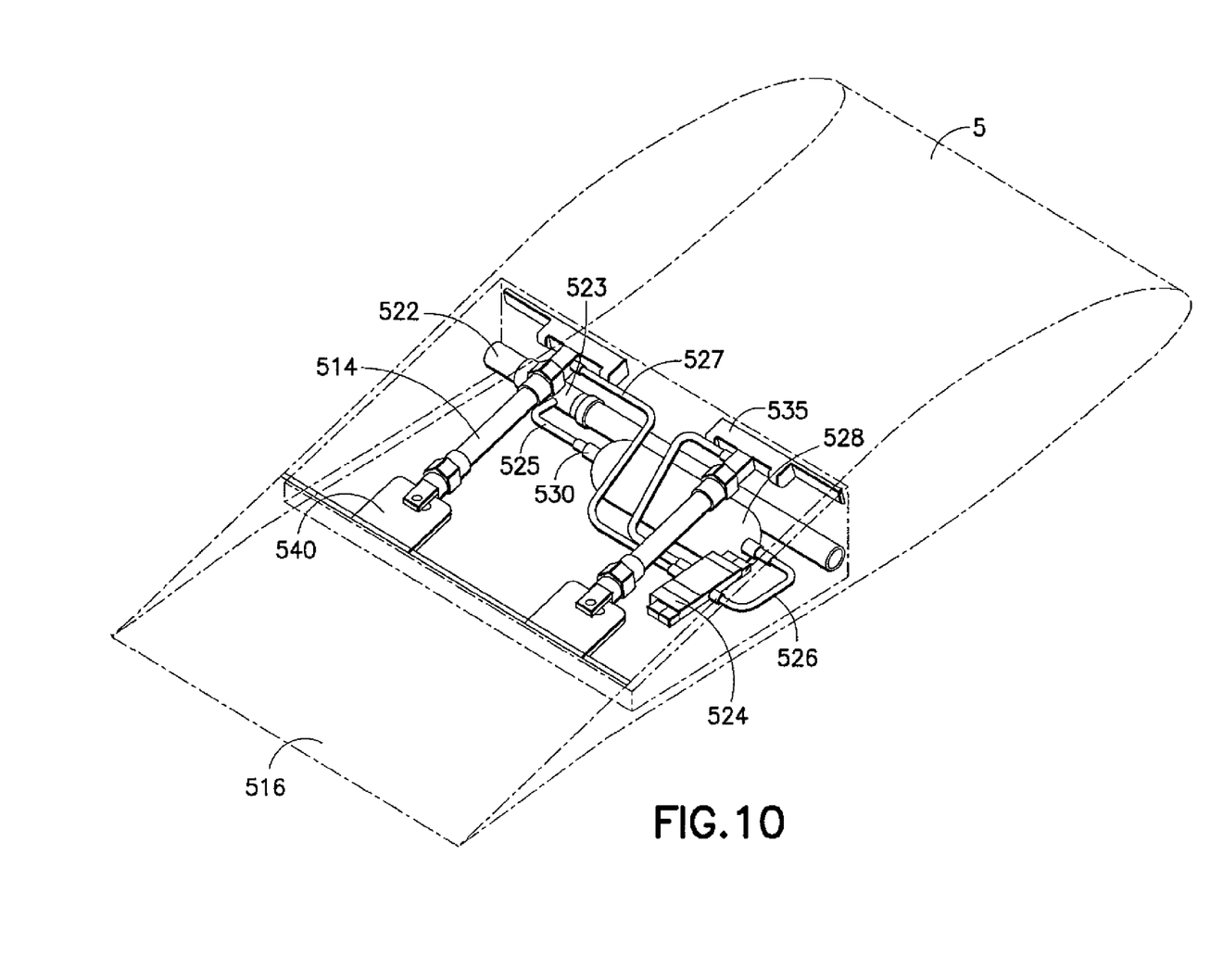
FIG. 10 is an isometric cross-sectional view in the chordwise direction through a wind turbine blade, illustrating a pneumatic muscle actuator.
Figure 11:
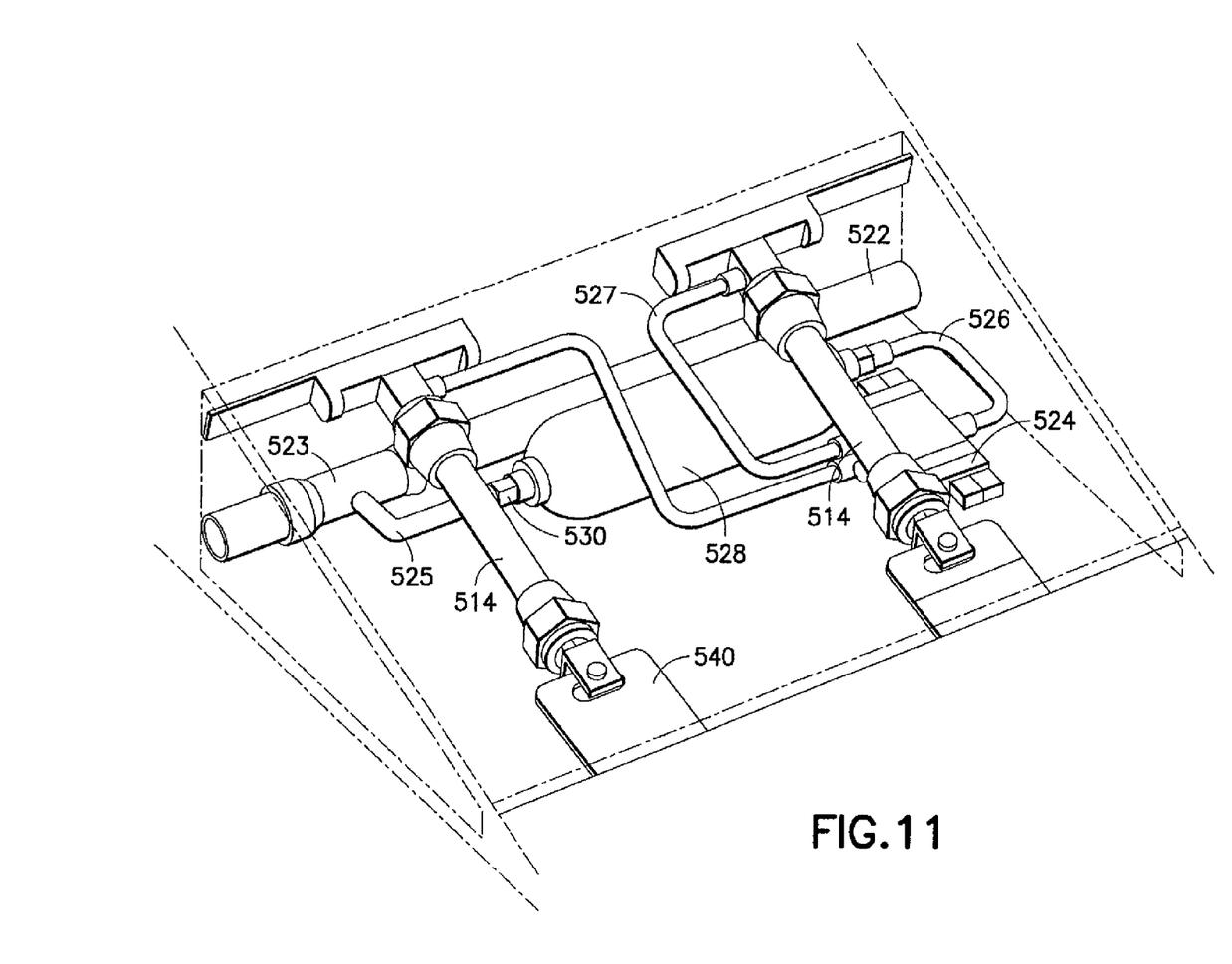
FIG. 11 illustrates an enlarged view of the pneumatic muscle actuator mounted in a wind turbine blade.

An example of the actuator will now be described with reference to FIGS. 10 and 11 which show more detail of the compartment 520 within the blade 5. In this example, two fluidic muscles 514 are provided in the blade between the main spar 512 and the flap 516, and are coupled to a fluid supply pipe 522, via a solenoid valve 524, feeder pipes 526 and 527, secondary tank 528 and non-return valve 530.

One end of each fluidic muscle 514 is mounted securely at a base portion 535, which may be secured to the main spar 512 or the wall of the compartment 520. The other end of each fluidic muscle 514 is attached to an actuator plate 540, which in turn is coupled to the flap 516. In use, changes in the fluid pressure supplied to fluidic muscles 514 cause the length of the muscle to change. An increase in pressure causes the diameter of the fluidic muscles to expand, but the length to contract, pulling the actuator plates 540 and the lower or pressure side of the flap 516 towards the main spar 512.

To achieve this, the supply pipe 522 transports pressurized fluid from a fluid reservoir optionally located in the blade, hub, nacelle, or tower, to the fluidic muscle in the blade. The supply pipe 522 may be made of plastic or another appropriate material, and can conveniently be mounted in or on the spar 512 of the blade, or alternatively on the wall of compartment 520. The supply pipe 522 itself is preferably made of a flexible material to accommodate flexing movement of the blade and spar in use. A stiff collar 523, say of metal, is provided in the pipe 522 so that a connection with the feeder pipe 525 can be made. The stiff collar 523 can also be used to attach the supply pipe 522 to the interior structure of the blade.

The feeder pipe 525 joins the supply pipe 522 to an optional secondary fluid tank 528, which is used to provide a local store of pressurized fluid for the fluidic muscle. The tank 528 can be omitted where the pressure of the fluid in the supply pipe 522 is sufficiently high.

The solenoid valve 524 receives fluid from the optional secondary fluid tank 528, or directly from the supply line 522 via feeder pipe 526, and according to a control signal received from an actuator controller permits or prevents the flow of fluid to fluidic muscles 514. Further feeder pipes 527 connect the solenoid valve 524 to the fluidic muscles 514.

Figure 12:
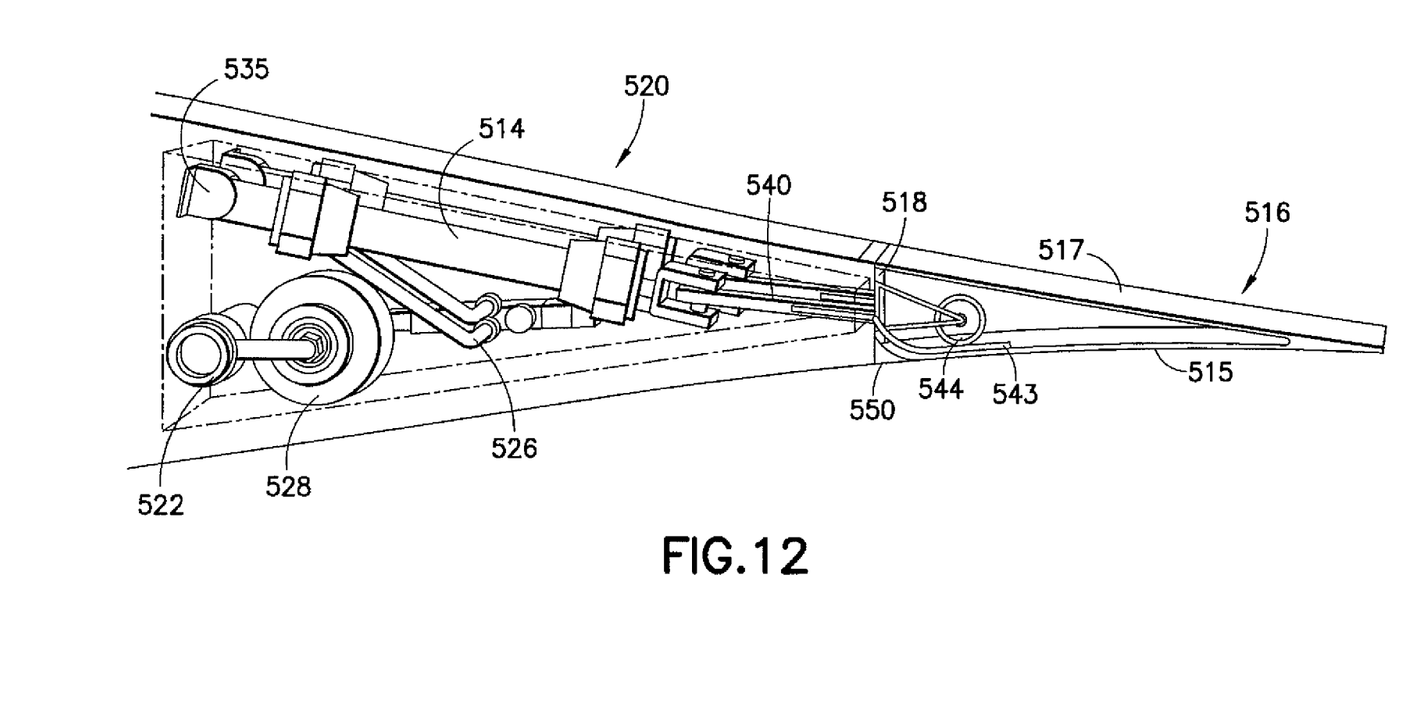
FIG. 12 illustrates a side view of the pneumatic muscle actuator of FIG. 11.

Not shown in the diagrams are one or more compressors or pumps to fill the fluidic muscles 514. The pump is provided between the source of pressurized fluid and the fluidic muscle, and could be located at the end of the supply pipe 522 in the wind turbine nacelle 3, hub 6, or blade root, or alternatively at an intermediate location in the supply pipe 522. It could also be located at the solenoid valve 524, in feeder pipes 525, 526 and 527, at the secondary tank 528 or the non-return valve 530. When the secondary tank 528 is provided, there are therefore at least two pumps, one pump to fill the secondary tank 528 from the supply pipe 522 and a second pump, preferably in the solenoid valve 524, to pressurize or depressurize the fluidic muscles. FIG. 12 is a side view of the compartment 520 showing in more detail the arrangement for attaching the fluidic muscle 514 to the flap 516. A first end of the actuator plate 540 is secured to the end of the fluidic muscle 514 closest to the flap 516, by a bolt or other suitable fastener. The first pressure side 515 of the flap 516 has an extension portion 543 that extends into the interior of the blade at a break in the pressure surface of the blade.

Figure 13:
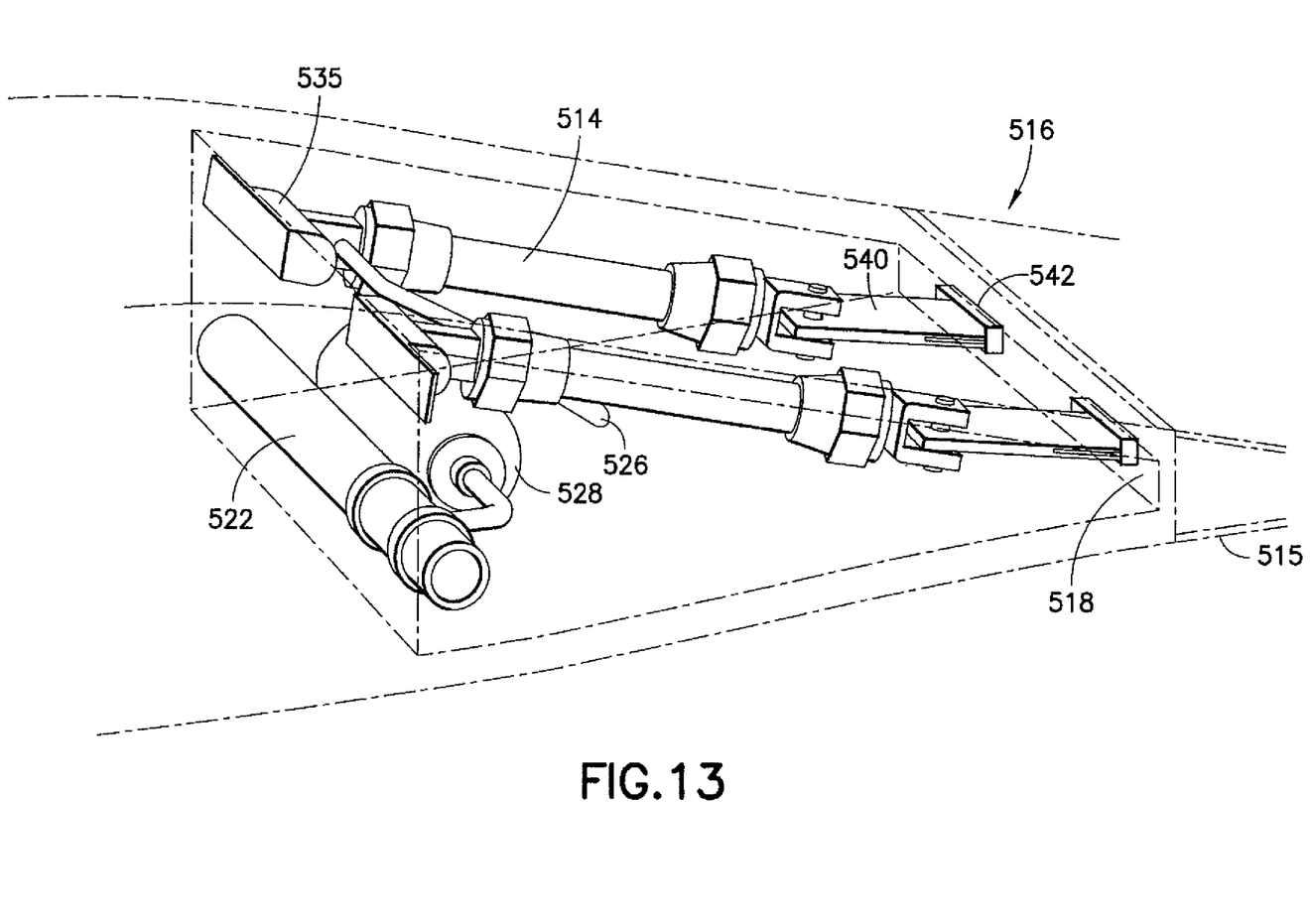
FIG. 13 illustrates a further view of the pneumatic muscle actuator of FIG. 11.

A section of the extension portion 543 is gripped by the actuator plate 540 at a second end, with the extension portion 543 and/or the actuator plate 540 passing through a slit or hole 542 (seen more clearly in FIG. 13) in the rear spar 518. A roller guide 544 is attached to the rear spar 518 and acts on the flap extension portion 543 so that it remains slightly under tension in operation.

A cover 550 is also provided to cover or substantially cover any gap between the first side 515 and the rear spar 518 of the blade body. The cover is provided to minimize ingress of water, debris, and any other foreign bodies into the inner workings of the flap 516 and blade 5. The cover may be attached to the rear spar 518, and can be in the form of an L-shaped plate as shown in the diagram made from a suitable composite material. Other suitable shapes and means for attaching the cover 550 to the blade or the rear spar will be apparent to the skilled person.

Returning now to FIGS. 9A and 9B, operation of the actuator shall now be explained in more detail. As noted above, the control surface in the preferred embodiment is a preloaded bendable flap 516. First pressure side 515 and second suction side 517 are both at least partly flexible, such that when not actuated by the force of the fluidic muscle 514, the flap 516 is biased to remain in the first position illustrated in FIG. 9A. The extension portion 543 of the flap 516 is attached to the fluidic muscle 514 via the actuator plate 540, such that actuation of the fluidic muscle 514 pulls on the extension portion 543, and pulls the flap 516 from the first operating position into the second operating position, changing the aerodynamic properties of the blade.

The movement of the extension portion 543 is controlled and stabilized by the cooperation of the actuator plate 540 with the slot 542, as well as the roller guide 544. The slot 542 constrains the actuator plate 540 to move in a solely translational chordwise manner under the action of the fluidic muscle 514. Thus, the force applied to the end of the extension portion 543 of the flap 516 is also solely translational. The roller 544 however acts on the extension portion 543 and displaces it slightly from the linear direction of movement defined by the fluidic muscle 514. This introduces tension in the extension portion 543 as it requires the extension portion 543 to roll around the roller 544.

As the extension portion 543 of the flap 516 is pulled towards the main spar 512 of the blade the first side 515 of the flap is also pulled towards the rear spar 518. To accommodate the movement of the flap 516, the first side 515 can, in one example, be made shorter than the second side 517, so that there is clearance for the flap to be pulled towards the rear spar 518 without buckling or deformation. In this case, the extension portion 543 can be omitted and the actuator plate 540 can extend through the rear spar 518 to attach directly to the interior of the first side 515 of the flap 516. The actuator plate 540 can be angled appropriately to extend from the fluidic muscle 514 to an attachment point at the inner surface of the first side 515. Alternatively, the actuator plate can have an elongate shape with an intermediate stepped portion that extends between the interior of the blade cavity, where the fluidic muscle is located, to the inside edge of the flap. The actuator plate 540 could be made of a suitably flexible material such as e-glass, otherwise known as fiberglass or glass-reinforced plastic. Other members for directly attaching the fluidic muscle to the first side 515 would occur to the skilled person.

Instead of actuator plate 540 gripping the extension portion 543, a wire or cable could be used to connect the first side 515 to the fluidic muscle 514.

In an alternative example, the rear spar 518 may be provided with a slot to receive the extension portion 543, or where the extension portion is omitted, the first side 515 allowing the flap 516 to slide under the rear spar 518 and partly into the cavity 520.

In operation, the flap is under tension when in the second position, and therefore stores potential energy applied by the fluidic muscle. Thus, when the fluidic muscle 514 is subsequently relaxed, the flap 516 returns to the first position. The fluidic muscle 514 could be relaxed by simply releasing a valve in a pump to let the pressurized fluid flow back into, for example, the secondary tank 528. A two-way pump or a second pump could also be provided to speed up the process.

In the example of FIGS. 9A and 9B, the flap is biased by pretensioning the material of which it is made. However, in other examples the flap could be made of a more rigid material and biased towards a first operating position by other means, for example, by a spring or a stressed spar. Therefore, a rigid wind turbine flap pivoted about a spar set in a wind turbine blade could also be actuated by the fluidic muscle 514. Leading edge slats could be actuated in a similar way, as could various other wind turbine control surfaces as listed previously.

Use of the roller guide 544 is not essential, and there are other mechanisms that can guide the first side 515 when it moves between the actuated and non actuated positions. One such mechanism is slide guide 546 shown in FIG. 14, which provides a curved surface or shoulder along which the extension portion 543 is at least partially constrained to move. The curved surface can therefore be convex and the extension portion slightly stretched over the surface so that it is under tension. This would provide a guide for first side 515 in which there are no moving parts, unlike the roller guide 544.

Figure 14:
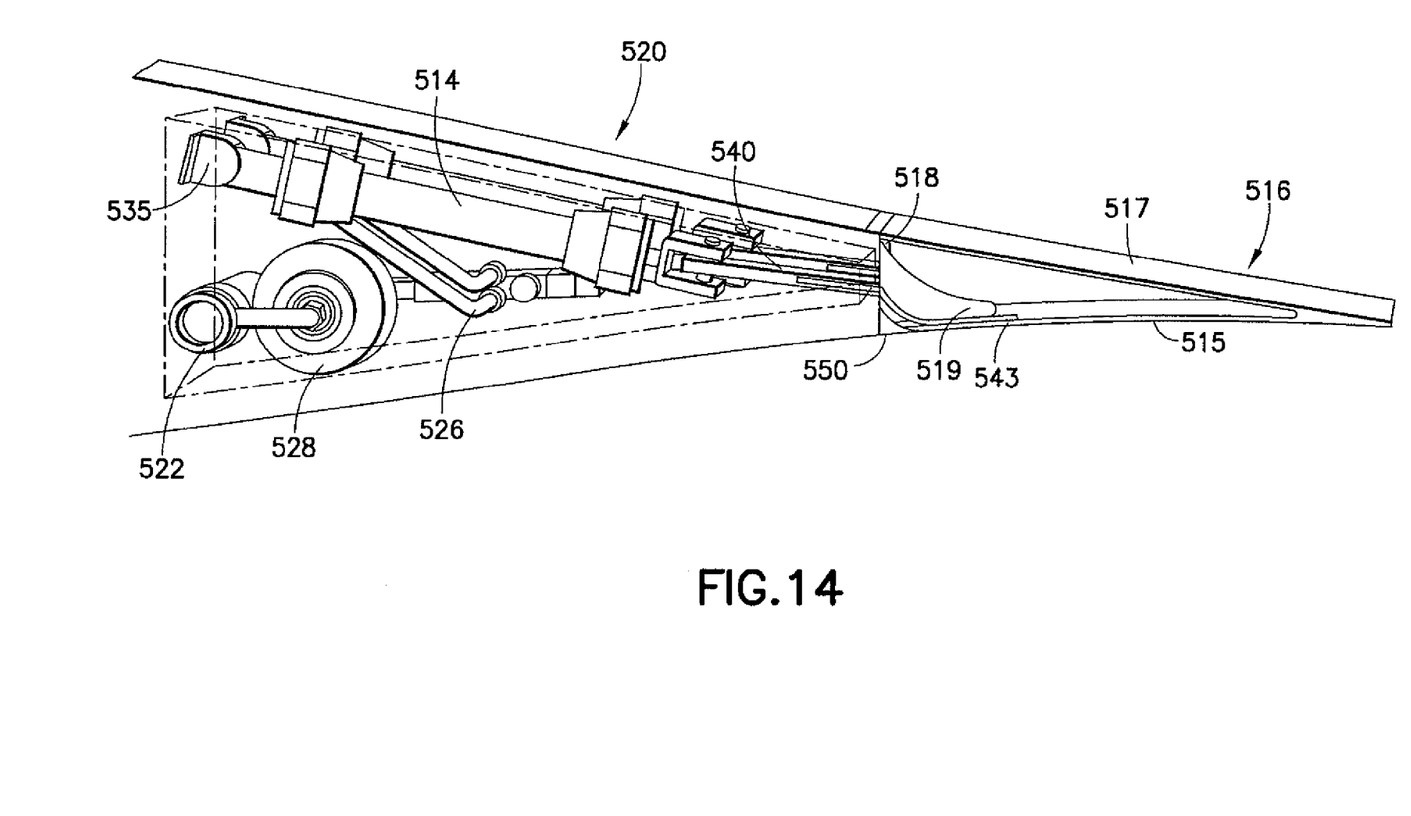
FIG. 14 illustrates an alternative example of the invention.

The roller guide 544 and the curved surface of slide guide 546 can be used in cases where the extension portion 543 is omitted and the first side 515 extends rearwards substantially to the rear spar 518. In this case, the roller or the surface can act on the first side 515 directly.

Of the two operating positions shown in FIGS. 9A and 9B, the default or rest position is assumed to be shown in FIG. 9A. This orientation is preferable as the fluidic muscle 514 can be relaxed faster than it can be pressurized, and because there is less danger of operating loads, such as from the flow of air over the blade surface, overwhelming the fluidic muscle and moving the flap 516 from the second position in FIG. 9B to the position in FIG. 9A merely by load on the blade 5. In alternative embodiments, the default position may be that shown in FIG. 9B.

It is also possible to provide an unstressed blade with two muscle actuators, one for pulling the first side and one for pulling the second side. In use, the flap is then moved from the first operating position shown FIG. 9A to the second operating position shown in FIG. 9B by the fluidic muscle 514, and a second fluidic muscle would be used to move the flap back to the position shown in FIG. 9A, rather like the action of muscles in a human arm, for example.

Two separate fluidic muscles could be provided, each muscle having a separate pump, or the two muscles could advantageously share a fluid source. This would have the added advantage of being a closed system in which the fluid in one muscle would simply be pumped to the other muscle, rather than being returned to the supply pipe or local storage tank.

A controller is also provided for controlling the solenoid valve 524 and any other actionable machinery within the fluid muscle actuator, such as any other valves or pumps that are provided. The controller could be a CPU, processor, computer, gate array, hardware logic, software, or a combination of hardware and software.

In one example, the controller is adapted to valve throttle the rate of pull or release of the fluidic muscle to provide intermediate operating positions for the flap. The rate of filling of the fluidic muscle could be similarly constrained. Therefore, while two positions have been described for the flap, it is possible for there to be three or more positions, attained by different levels of contraction of the pneumatic muscle actuator.

Although the fluidic muscles for operating the trailing edge flaps are arranged substantially in the chord-wise direction, fluidic muscles at different angles, such as 45 degrees from chordwise, would also work, particularly if provided in pairs. The fluid used to pressurize the fluidic muscle may also be a gas or a liquid. Suitable gases are air, Nitrogen, or a noble gas such as Helium.

Where attachment methods have not been described in detail, attachment could be achieved by bolting, gluing, slotting together, screwing, nailing, or any other appropriate means as will be appreciated by those skilled in the art.

In practice, the trailing edge of the flap 516 may be made stiffer or rigid in comparison to the rest of the outer skin 510 of the flap 516 which is flexible. The control surface itself could have a rigid outer skin in some embodiments.

Although a horizontal axis wind turbine is shown in FIG. 1, the present invention is applicable to any wind turbine, including for example a vertical axis turbine having a rotor with one or more blades.

Various modifications to the embodiments described are possible and will occur to those skilled in the art without departing from the invention which is defined by the following claims

What is claimed:
1. A wind turbine blade comprising:
a blade body,
at least one blade control surface, and
an actuator for moving the at least one blade control surface relative to the blade body,
wherein the actuator comprises a fluidic muscle adapted to contract in a chordwise direction when the pressure of the fluid within the fluidic muscle increases, such that the at least one blade control surface is drawn from a first operating position into a second operating position, and wherein the control surface is made of a pretensioned resilient material, such that the control surface is biased to move from the second operating position to the first operating position when the fluidic muscle is relaxed.

2. The wind turbine blade of claim 1, wherein the actuator contains at least one pair of fluidic muscles, and wherein one fluidic muscle of the pair acts to move the blade control surface from a first position to a second position, and the second fluidic muscle of the pair acts to move the blade control surface from a second position to a first position.

3. The wind turbine blade of claim 1, wherein the fluidic muscle is housed in a compartment in the blade body.

4. The wind turbine blade of claim 1, wherein a first end of the fluidic muscle is attached to the blade body.

5. The wind turbine blade of claim 4, wherein the first end of the fluidic muscle is coupled to a structural spar in the main body.

6. The wind turbine blade of claim 1, wherein a second end of the fluidic muscle is coupled to the at least one blade control surface.

7. The wind turbine blade of claim 6, wherein the at least one blade control surface comprises a first side, forming a part of the external surface of the blade, and an extension portion of the first side for extending into the blade body and coupling to the second end of the fluidic muscle.

8. The wind turbine blade of claim 7, comprising a shoulder for applying tension to the extension portion of the at least one blade control surface.

9. The wind turbine blade of claim 8, wherein the shoulder comprises a roller.

10. The wind turbine blade of claim 8, wherein the shoulder is a curved guide surface.

11. The wind turbine blade of claim 1, wherein the blade body comprises a rear spar located adjacent the at least one blade control surface in the chordwise direction, and the fluidic muscle couples to the at least one blade control surface through a slot in the rear spar.

12. The wind turbine blade of claim 1, where the at least one blade control surface comprises a first side, forming a part of the external surface of the blade, and wherein the first side is truncated to leave a gap between the first side and the blade body to accommodate movement of the at least one blade control surface from the first to the second position.

13. The wind turbine blade of claim 12, comprising a cover, extending from the blade body towards the first side to substantially cover the gap.

14. The wind turbine blade of claim 12, comprising an actuator member extending between the fluidic muscle and the first side of the at least one blade control surface.

15. The wind turbine blade of claim 1, wherein the fluidic muscle is arranged in a substantially chordwise direction to the blade body.

16. The wind turbine blade of claim 1, comprising a supply pipe for providing fluid to the fluidic muscle.

17. The wind turbine blade of claim 16, wherein the supply pipe is pressurized.

18. The wind turbine of claim 16, comprising a valve for controlling the flow of fluid to the fluidic muscle.

19. The wind turbine of claim 18, wherein the valve is a solenoid valve.

20. The wind turbine blade of claim 1, wherein the actuator comprises a local fluid storage tank.

21. The wind turbine blade of claim 1, wherein the actuator comprises a pump coupled directly to the fluidic muscle.

22. The wind turbine blade of claim 1, wherein the actuator is operable to provide at least a first flap operating position, a second flap operating position and a third flap operating position.

23. The wind turbine blade of claim 1, wherein the at least one control surface is a trailing edge flap on the trailing edge of the blade.

24. A wind turbine comprising the wind turbine blade of claim 1.

25. The wind turbine of claim 24, comprising: an actuator controller; and a pump for supplying fluid under pressure to one or more fluidic muscles located in the wind turbine blades.

* * * * *